UNITED STATES PATENT OFFICE.

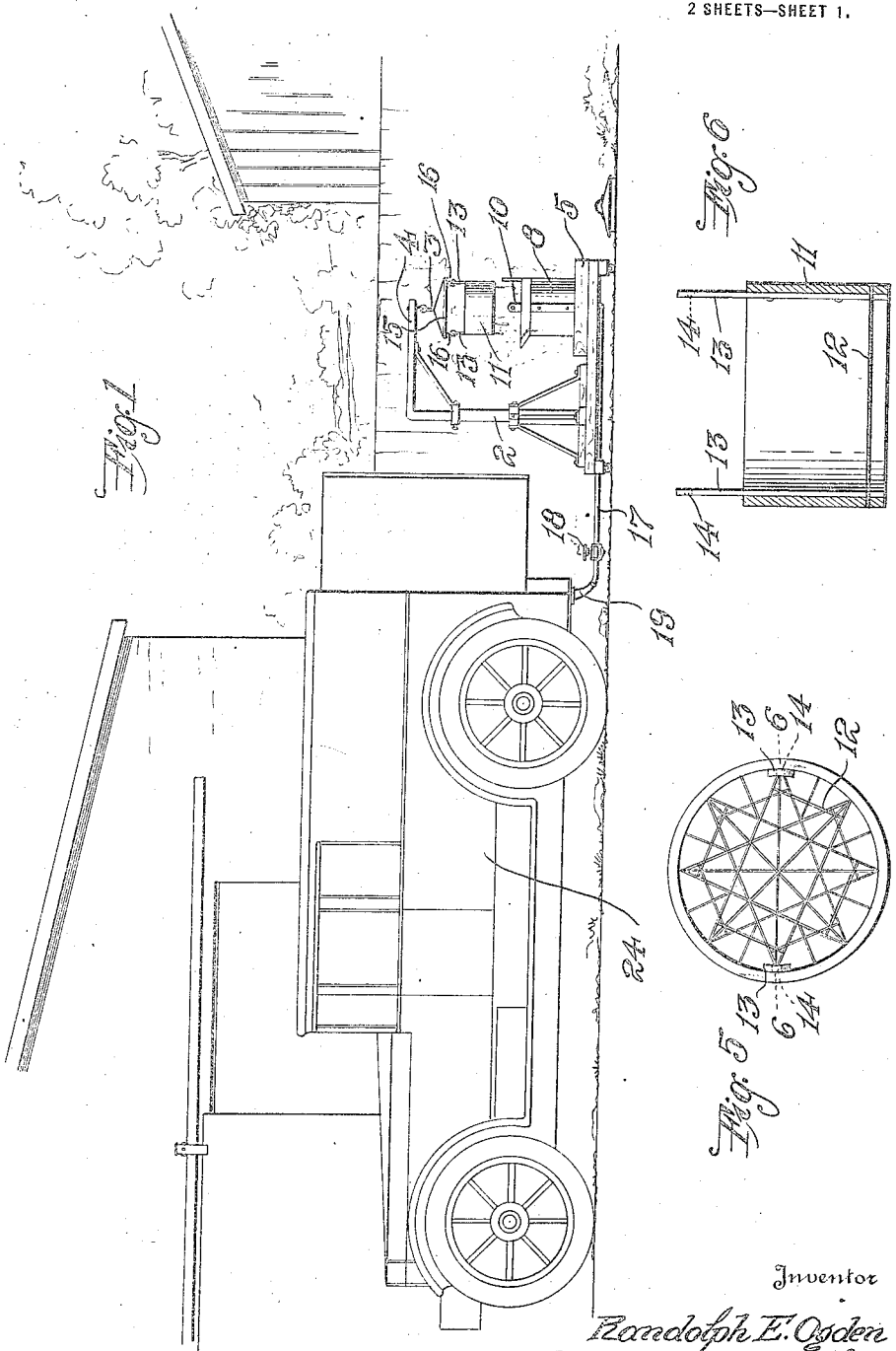

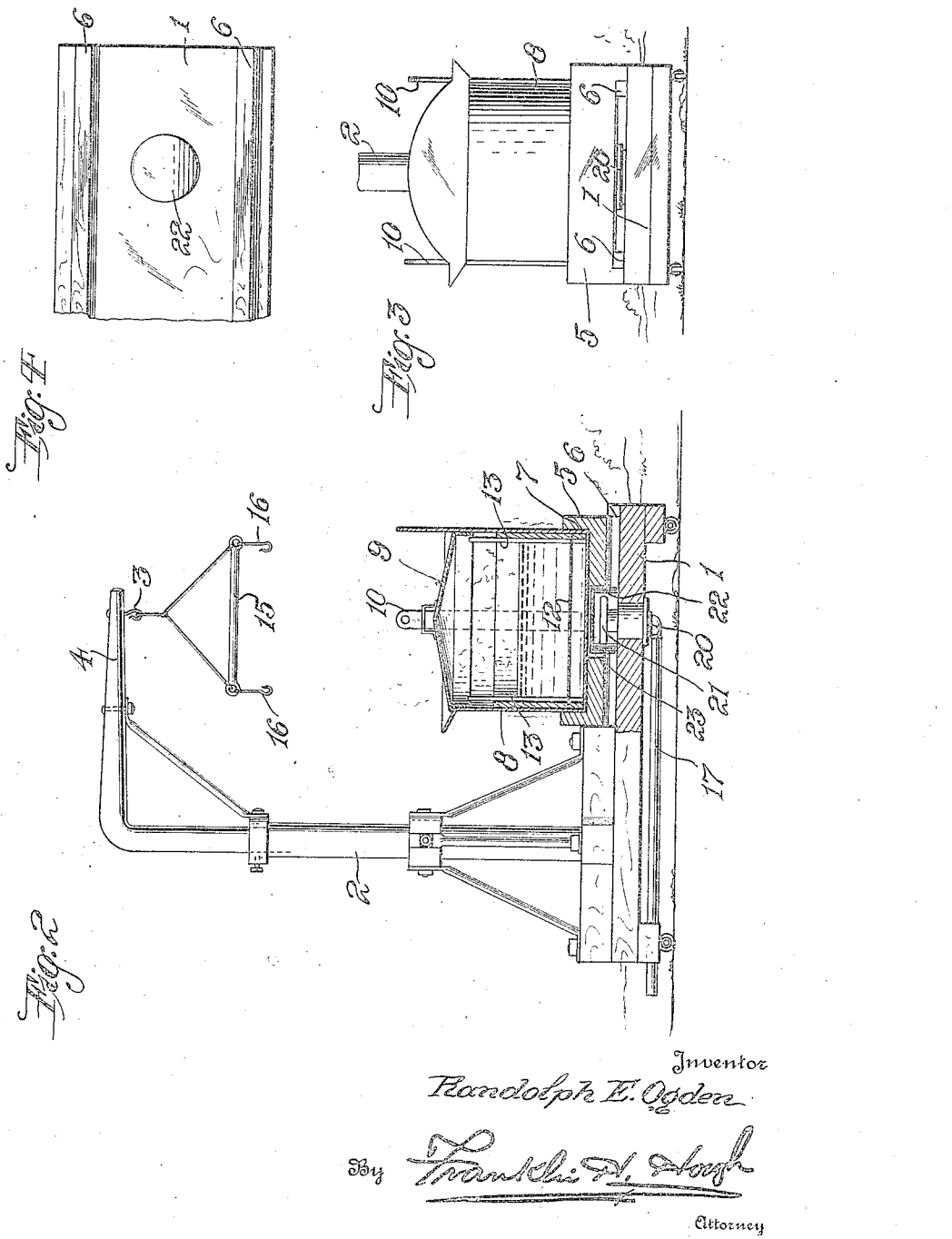

RANDOLPH E. OGDEN, OF ROCKVILLE, INDIANA.

HARNESS OILER.

1,426,903.   Specification of Letters Patent.   Patented Aug. 22, 1922.

Application filed May 1, 1920. Serial No. 378,327.

*To all whom it may concern:*

Be it known that I, RANDOLPH E. OGDEN, a citizen of the United States, residing at Rockville, in the county of Parke and State of Indiana, have invented certain new and useful Improvements in Harness Oilers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a device which is coupled to the exhaust of an automobile, for oiling harness, or other objects.

The accompanying drawings clearly disclose the invention and like reference characters designate corresponding parts throughout the several views.

Briefly described:

Figure 1 is a view in side elevation of the device of my invention in operative position with relation to an automobile.

Figure 2 is a view in side elevation, partly in section, of the device of my invention detached from the automobile.

Figure 3 is a view in end elevation of the oiling pot and the wheel support on which it is mounted.

Figure 4 is a fragmentary view, in bottom plan, of the base member carrying the pot.

Figure 5 is a top plan view of a basket adapted to be disposed within the oiling pot, and Figure 6 is a sectional view on the line 6—6 of Figure 5.

Referring now in detail to the drawings:

1 designates a wheeled platform supporting a derrick 2 of any suitable construction, and carrying a hook 3 at the free end of the upper angular arm 4 thereof.

Removably supported upon said platform 1 is a base 5 preferably provided, on its under surface, with longitudinally extending ribs 6, 6 adapted to slide in corresponding grooves in the upper surface of the platform 1. Said base 5 is recessed upon its upper surface, as shown at 7, for the reception of a tank 8, provided with a cover 9, to close the open end thereof. The tank is provided, at its upper end, with perforated upstanding ears 10.

Within said tank 8 is removably disposed a basket 11 which is, preferably, an open-ended cylindrical member provided, toward its lower end, with a screen member 12. The basket is provided with arms 13 projecting upward from the top of the basket, as shown, and apertured, as shown at 14.

Suspended from the hook 3 is a lifting device 15 carrying hooks 16, 16 adapted to engage in the openings 14, 14 to lift the basket out of the pot 8, and which may thereafter be engaged with the perforations in the ears 10 of the pot 8 to lift the latter.

17 designates a pipe with a valve 18, which pipe may be connected with the exhaust pipe 19 of the automobile. Said pipe 17 runs, as shown, beneath the platform 1, and on the end of said pipe is a coupling 20 projecting through the base 1 and carrying a hollow member 21 disposed within a cylindrical member 22 carried by the base 1 from the top thereof. The cylindrical member 22 is adapted to project into an opening 23 in the base 5. The members 21 and 22 are metal and can be highly heated by the exhaust gases emanating from the exhaust of the automobile and conveyed by the pipe 17 and radiate the heat to the bottom of the tank 8; thereby keeping the oil therein heated and tending to soften the leather harness disposed in the basket 11.

In operation, the harness is placed in the basket 11, which is thereupon lowered into the tank 8 containing the oil, and the pipe 17 coupled with the exhaust 19 of the automobile, thus providing a very effective device for oiling and softening the harness. When not desired to be used, the apparatus may be disconnected from the exhaust 19 and disposed within the automobile 24 to be transported from place to place.

What I claim to be new is:

In a harness oiler the combination of a basket comprising substantially cylindrical imperforate walls and perforate to form a bottom, rigid perforate ears upstanding above the top of the cylinder, a tank of appropriate depth to contain the basket with the ears upstanding, rigid perforate ears upstanding above the top of the tank, an outwardly flared flange at the top of the tank, a cover proportioned to set within the flange and close the tank with the basket therein, and a hoisting device provided with hooks proportioned to engage the perforations and a bar proportioned to hold the hooks spaced substantially equal to the spacing of the ears of the basket and tank.

In testimony whereof I hereunto affix my signature.

RANDOLPH E. OGDEN.